UNITED STATES PATENT OFFICE.

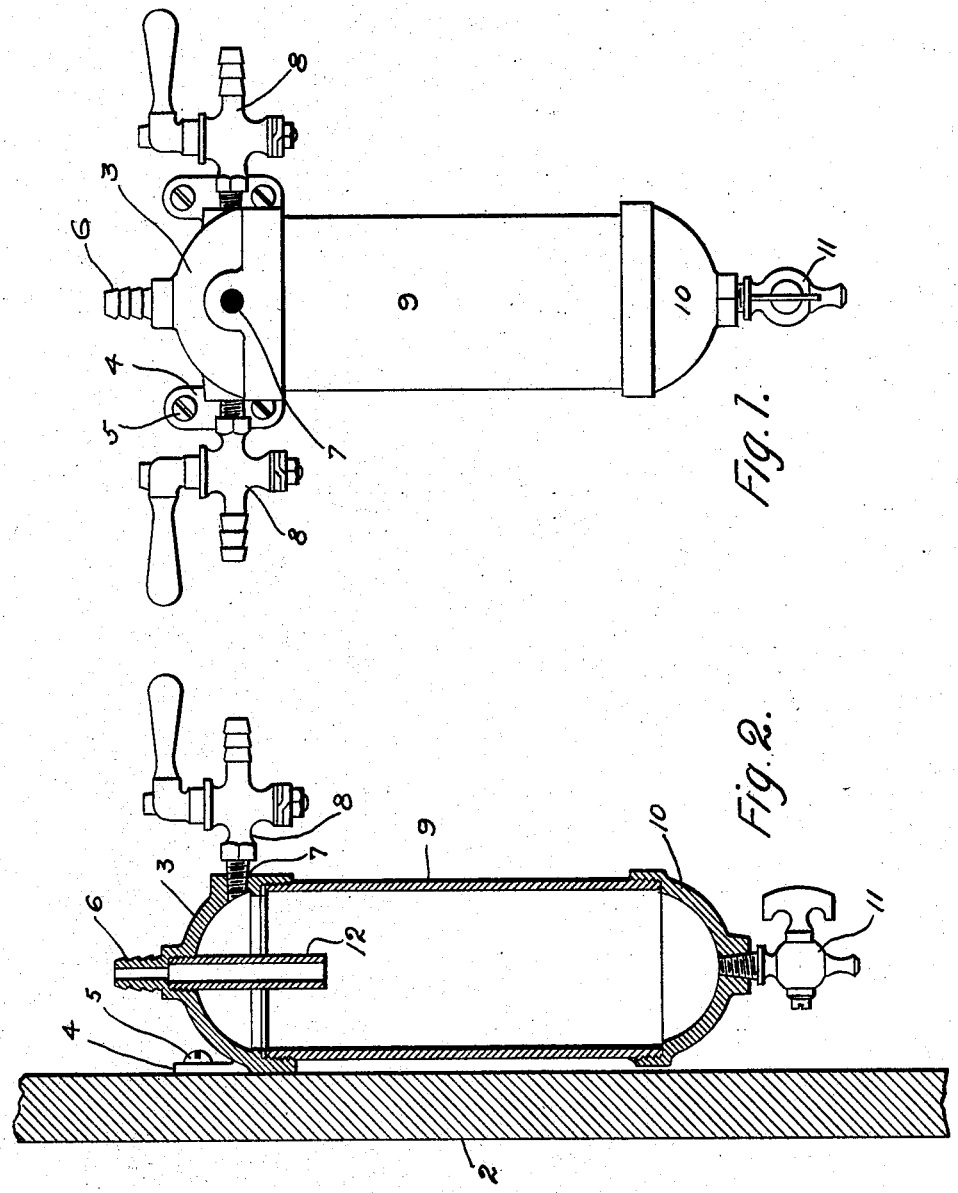

JOSEPH B. TUOR, OF ST. PAUL, MINNESOTA.

FLUID-PRESSURE DISTRIBUTER.

No. 901,049.  Specification of Letters Patent.  Patented Oct. 13, 1908.

Application filed October 4, 1905. Serial No. 281,364.

*To all whom it may concern:*

Be it known that I, JOSEPH B. TUOR, of St. Paul, Ramsey county, Minnesota, have invented certain new and useful Improvements in Fluid-Pressure Distributers, of which the following is a specification.

My invention relates to means for distributing fluid pressure from a central point, and the object of my invention is to provide a distributer which is easily removable from its support and accessible for cleansing purposes.

A further object is to provide a distributer of simple, economical construction, and one that will not easily get out of order, and will be very durable.

The invention consists generally in providing a distributer head having means for securing it to a wall or other support, and provided with a pump connection and with connections for tubes leading to different points and a cylinder having a drain cock in its lower end and removably supported in said head.

In the accompanying drawing forming part of this specification, Figure 1 is a front elevation of a fluid pressure distributer embodying my invention. Fig. 2 is a vertical sectional view of the same.

In the drawing, 2 represents a wall or support, 3 the upper head of a fluid pressure distributer having brackets 4 and screws 5 for securing it to said wall, and a nipple 6 to which the hose leading from a pump is attached. The head 3 is tapped at intervals to form ports 7 for valves 8 through which the pressure is distributed to various points. When the device is used in connection with a beer pump, the tubes will lead from the air distributer to the barrels, and there may be any number of the valves and tubes according to the size of the distributer and the number of barrels it is desirable to connect therewith. When one of the tubes is not in use its valve is closed to prevent the escape of air from the distributer. The head 3 is threaded to receive the threaded upper end of a cylinder 9 whose lower end is also threaded, preferably, and carries a head 10 having a drain cock 11 through which the water accumulating in the cylinder is drained off. A tube 12 is provided within the head 3 depending from the lower end of the nipple 6 to a point below the ports in the walls of the head, to prevent any sediment or water from being blown into the branch tubes from the pump. The cylinder and head 10 are not secured on the wall and can be easily and quickly removed without disturbing the head 3 or its connections. This distributer while designed primarily for use in connection with a beer pump is also adapted for use wherever it is desirable to distribute a fluid pressure to different points.

I claim as my invention:

A fluid pressure distributer comprising a head having means for securing it on the wall and provided with an open threaded lower end and with an upwardly projecting nipple adapted to receive a tube connection, said head having a series of ports in its wall and valves for said ports, a cylinder open at each end and having a threaded upper end removably fitting within the open threaded end of said head and capable of removal therefrom without detaching the head from the wall, a second head mounted on the lower end of said cylinder and closing the same and having a suitable drain cock and removable with said cylinder from said first named head, substantially as described.

In witness whereof, I have hereunto set my hand this 29th day of September 1905.

JOSEPH B. TUOR.

Witnesses:
RICHARD PAUL,
C. MACNAMARA.